Oct. 26, 1926.
E. E. DONNAN
AGRICULTURAL AND OTHER IMPLEMENT
Filed August 6, 1924
1,604,264
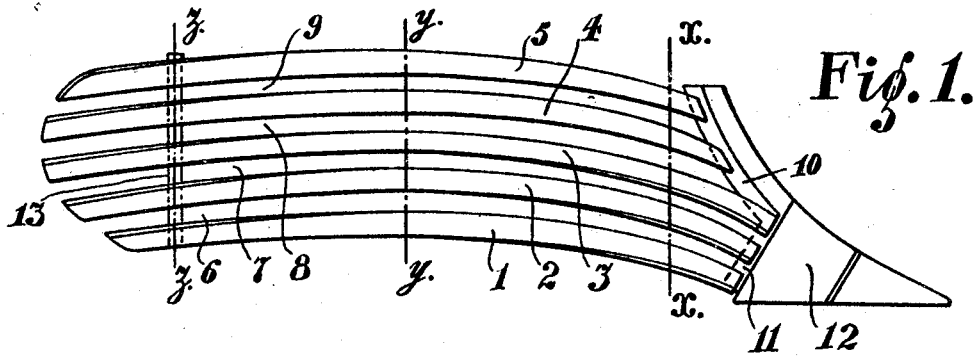
Fig. 1.
Fig. 2.
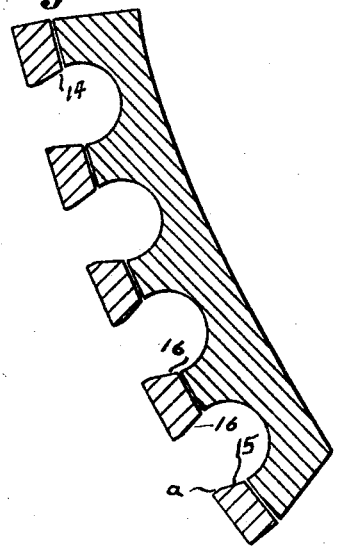
Fig. 3.
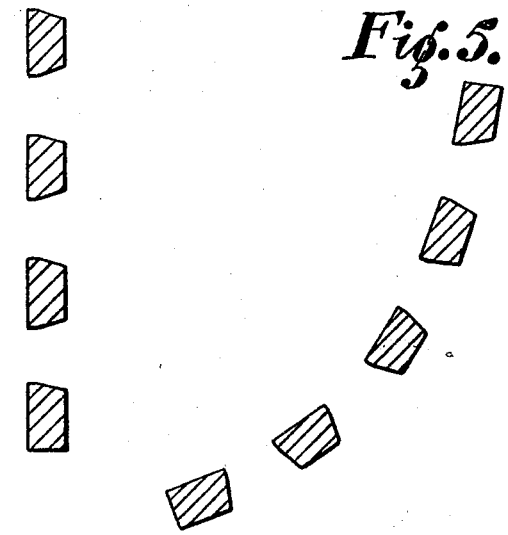
Fig. 4.
Fig. 5.
INVENTOR
ERNEST EDWARD DONNAN
By John B Brady
Attorney Patented Oct. 26, 1926.

1,604,264

UNITED STATES PATENT OFFICE.

ERNEST EDWARD DONNAN, OF BELFAST, IRELAND.

AGRICULTURAL AND OTHER IMPLEMENT.

Application filed August 6, 1924, Serial No. 730,504, and in Great Britain August 13, 1923.

This invention relates to mouldboards of the skeleton type for land ploughing ploughs, i. e. to mould boards made up of a number of substantially parallel bars curved and twisted so that, as a whole, they conform to the shape of an ordinary one piece mould board.

Such mould boards are of particular advantage in tenacious or clayey soil, since the reduced superficial area of the mouldboard acting on the soil allows of a corresponding reduction in the draught required for the plough.

According to the present invention a mouldboard of the kind referred to is characterized by the upper and lower edges of the bars, with the exception of the lower edge of the lowest bar and the upper edge of the topmost bar, being bevelled, i. e. inclined at an angle less than a right angle to the working face, the working face of each bar being thus greater than the reverse face.

By bevelling the edges of the bars in this way the spaces between the bars are less likely to become clogged up, as the mouldboard passes along the furrow.

An example of a land-plough mouldboard, or breast, made in accordance with this invention is shown in the accompanying drawings, whereon:—

Fig. 1 is an elevation of the land-plough mouldboard.

Fig. 2 is a plan view corresponding to Fig. 1.

Fig. 3 is a sectional elevation on the line Z—Z Fig. 1.

Fig. 4 is a sectional elevation on the line Y—Y Fig. 1.

Fig. 5 is a sectional elevation on the line X—X Fig. 1.

Referring to the drawings:—

The land plough mouldboard shown in the drawings comprises five bars (this number being, of course, variable according to conditions), numbered respectively from the bottom up, 1, 2, 3, 4 and 5. The bars, as shown, have a uniform width of working face throughout their length but the interlying spaces numbered, from the bottom up respectively 6, 7, 8 and 9, are widened out progressively and uniformly from, or near, the leading end of the mouldboard towards the rear end thereof, so that the depth, or width, of the completed mouldboard measured approximately at right angles to its longitudinal axis is slightly greater at, or towards, the rear end than at the forward or leading end. The bars are shown secured, at their forward or leading ends, to carrying members 10 and 11 and are set in co-operative relationship with a penetrating pointed front plate or share, 12. Near their rear ends the bars are secured to a carrying bar 13 shaped, as shown in cross section at Fig. 3, so that it does not present any obstruction, or impediment, to material which it is desired, or desirable, should pass through the spaces between the bars.

The bars 1 to 5, as shown, in addition to being supported so that the spaces therebetween are increased progressively from their front ends to their rear ends, are each individually formed with an axial twist therein as clearly shown in Fig. 1 and each bar is also curved longitudinally and laterally, as shown at Fig. 2, so that the series of bars take the formation or shape, so far as their soil engaging surfaces are concerned, of the usual form of one-piece mouldboard, or breast, the shape in each case being altered according as it is desired to follow the shape of an English, American, or other type of mouldboard, and the application of this design or formation of the instrument may be applied generally not only to mouldboards or breasts for ploughs and soil engaging agricultural implements of any kind for which it is or may be adapted.

The bar 5 is bevelled on the under edge 14, the bar 1 bevelled at the upper edge 15 and the intermediate bars 2, 3, 4, are bevelled at both edges 16. This bevelling of the edges of the bars is not carried right up to the working faces but portions or strips $a$ adjacent to and extending along the working faces of the bars lie in planes at right angles to the said working faces, the bevelling commencing where the strips $a$ terminate. The object in providing the bars with these portions $a$ is to allow of the working faces being worn away to a considerable extent without reducing the width of the working faces.

It will be apparent that stones, soil and other matter entering the spaces between the bars are less likely to lodge there on account of the bevelling which tends to cause such matter to pass through and not clog the spaces.

Having now fully described my invention what I claim and desire to secure by Letters Patent is:—

A mouldboard for ploughs, comprising in combination with a plough share, a plurality of curved and twisted bars spaced apart and having a part of their upper and lower edges adjacent to the working faces of the bars at right angles to the said working faces whereafter the said upper and lower edges are bevelled towards the reverse faces of the bars.

In testimony whereof I affix my signature.

ERNEST EDWARD DONNAN.